US 7,596,188 B2

(12) United States Patent
Gotanda et al.

(10) Patent No.: US 7,596,188 B2
(45) Date of Patent: Sep. 29, 2009

(54) DIGITAL INTERFACE DECODE RECEIVER APPARATUS

(75) Inventors: Chikara Gotanda, Suita (JP); Yutaka Nio, Osaka (JP); Kouichiro Nagata, Ibaraki (JP)

(73) Assignee: Panasonic Corporation, Osaka (JP)

( * ) Notice: Subject to any disclaimer, the term of this patent is extended or adjusted under 35 U.S.C. 154(b) by 669 days.

(21) Appl. No.: 10/548,066

(22) PCT Filed: May 27, 2004

(86) PCT No.: PCT/JP2004/007665

§ 371 (c)(1),
(2), (4) Date: Sep. 6, 2005

(87) PCT Pub. No.: WO2004/107746

PCT Pub. Date: Dec. 9, 2004

(65) Prior Publication Data

US 2006/0077298 A1   Apr. 13, 2006

(30) Foreign Application Priority Data

May 28, 2003   (JP)   .............................. 2003-150638

(51) Int. Cl.
   *H03K 9/00*   (2006.01)
(52) U.S. Cl. .................. 375/316; 375/137; 375/149; 370/313; 455/525
(58) Field of Classification Search .................. 375/316
   See application file for complete search history.

(56) References Cited

U.S. PATENT DOCUMENTS

| 4,178,549 A | * | 12/1979 | Ledenbach et al. .......... 375/238 |
| 4,739,403 A | * | 4/1988 | Mark .......................... 348/511 |
| 4,984,254 A | | 1/1991 | Thomas |
| 5,774,061 A | * | 6/1998 | Kudoh ......................... 340/7.55 |
| 5,940,136 A | * | 8/1999 | Abe et al. .................... 348/537 |
| 6,130,721 A | | 10/2000 | Yoo et al. |

(Continued)

FOREIGN PATENT DOCUMENTS

JP   1-318971 A   12/1989

(Continued)

OTHER PUBLICATIONS

DDWG, "Digital Visual Interface," Revision 1.0, Apr. 12, 1999.

(Continued)

*Primary Examiner*—Shuwang Liu
*Assistant Examiner*—Lihong Yu
(74) *Attorney, Agent, or Firm*—Greenblum & Bernstein, P.L.C.

(57) ABSTRACT

A power-down determination circuit calculates the horizontal frequency and vertical frequency, respectively, employing a clock signal obtained from a multiplier circuit and horizontal synchronization signal and vertical synchronization signal obtained from a TMDS decode circuit. The power-down determination circuit then determines whether an input digital signal does or does not have a decodable video format by comparing the calculated horizontal frequency and vertical frequency with horizontal frequencies and vertical frequencies stored beforehand, for output of a power-down control signal indicative of the determination. Thus, in the case where the input digital signal does not have a decodable format, the power-down control signal controls a video/audio processing circuit to enter a power-down mode.

4 Claims, 6 Drawing Sheets

U.S. PATENT DOCUMENTS

| | | |
|---|---|---|
| 6,384,867 B1 | 5/2002 | Seino et al. |
| 6,757,229 B2 * | 6/2004 | Izawa .................. 369/47.33 |
| 6,816,444 B1 * | 11/2004 | Hayakawa et al. ......... 369/47.2 |
| 7,057,667 B1 | 6/2006 | Mori et al. |
| 2001/0005448 A1 | 6/2001 | Okada et al. |
| 2001/0026630 A1 | 10/2001 | Honda |
| 2003/0035486 A1 | 2/2003 | Kato et al. |
| 2003/0090590 A1 | 5/2003 | Yoshizawa et al. |
| 2003/0112828 A1 | 6/2003 | Nio et al. |
| 2005/0156869 A1 | 7/2005 | Mori et al. |
| 2006/0125959 A1 | 6/2006 | Yoshizawa et al. |

FOREIGN PATENT DOCUMENTS

| | | |
|---|---|---|
| JP | 6-189294 | 7/1994 |
| JP | 10-243322 A | 9/1998 |
| JP | 10-336585 | 12/1998 |
| JP | 2000-155553 A | 6/2000 |
| JP | 2000-250503 A | 9/2000 |
| JP | 2001-083927 A | 3/2001 |
| JP | 2001-101835 | 4/2001 |
| JP | 2001-285897 | 10/2001 |
| JP | 2002-199359 A | 7/2002 |
| JP | 2002-318572 A | 10/2002 |
| JP | 2002-369096 | 12/2002 |
| JP | 2003-110963 | 4/2003 |
| JP | 2003-153124 A | 5/2003 |
| KR | 2001 0032946 | 4/2001 |
| WO | 00/22623 | 4/2000 |
| WO | 03/058826 | 7/2003 |

OTHER PUBLICATIONS

HDMI (High Definition Multimedia Interface) [Specification Version 1.0], Jun. 25, 2002.

U.S. Appl. No. 09/593,368 to Naoya, filed Jun. 14, 2000.

English language Abstract and partial translation of JP 2001-083927 A, Mar. 30, 2001.

English language Abstract of JP 2002-318572 A.

English language Abstract of JP 2000-155553 A.

English language Abstract of JP 10-243322 A.

HDMI (High Definition Multimedia Interface) [Specification Version 1.0], published Sep. 4, 2003.

\* cited by examiner

F I G. 2

| NO | FORMAT | HORIZONTAL FREQUENCY (kHz) | VERTICAL FREQUENCY (Hz) | DOT CLOCK FREQUENCY (MHz) | DISPLAYED DOT NUMBER (HORIZONTAL × VERTICAL) |
|---|---|---|---|---|---|
| 1 | 1080(60i) | 33.75 | 60 | 74.25 | 1920×1080 |
| 2 | 720(60p) | 45.00 | 60 | 74.25 | 1280×720 |
| 3 | 480(60i) | 15.73 | 59.94 | 27.00 | 1440×480 |
| 4 | 480(60p) | 31.47 | 59.94 | 27.00 | 720×480 |

FIG. 5

INPUT OF A SIGNAL IN
A FORMAT INCOMPATIBLE WITH
THE RECEIVER HAS OCCURRED

DIGITAL INTERFACE DECODE RECEIVER APPARATUS

TECHNICAL FIELD

The present invention relates to a digital interface decode receiver that receives digital signals.

BACKGROUND ART

In recent years, the development of a variety of electronic equipment in accordance with high-speed digital interface standards, such as the HDMI (High Definition Multimedia Interface) standard or DVI (Digital Visual Interface) standard, is in progress (DDWG, "Digital Visual Interface," Revision 1.0, Apr. 2, 1999, Internet <URL:http://www.ddwg.org/>). The HDMI standard, in particular, defines the transmission of an audio signal and control signal during the video blanking intervals. These high-speed digital interface standards adopt the so-called TMDS (Transmission Minimized Differential Signaling) serial transmission system.

FIG. 6 is a block diagram showing an example of a conventional high-speed digital interface decode receiver. Referring to FIG. 6, the conventional high-speed digital will be described.

In FIG. 6, the high-speed digital interface decode receiver (hereafter abbreviated to the interface decode receiver) includes a plurality of differential buffers 60a, 60b, 60c, 60d, a TMDS decoder circuit 61, a multiplier circuit 62, and a video/audio processing circuit 65. The interface decode receiver is composed of a receiver LSI (Large Scale Integrated Circuit) 66.

The interface decode receiver receives digital signals in accordance with a high-digital interface standard.

A clock-channel signal B of the digital signals is applied to the multiplier circuit 62 as a clock signal D via the differential buffer 60d. The multiplier circuit 62 multiplies the clock signal D, and outputs the multiplied signal D as a multiplied clock signal E.

Signals A of the digital signals except the clock channel are applied to the TMDS decoder 61 via the differential buffers 60a, 60b, 60c. The TMDS decoder 61 serial/parallel converts and decodes the signals except the clock channel for output of a synchronization signal G and a video/audio signal F.

The video/audio processing circuit 65 separates the video/audio signal F output from the TMDS decoder 61 into a video signal I, audio signal J, and control signal K for output.

In the conventional interface decode receiver, the digital signals in accordance with the high-speed digital interface standard are decoded by means of the foregoing operation.

However, in cases where the conventional interface decode receiver receives digital signals in formats that cannot be decoded, the receiver LSI 66 may operate at speeds beyond a specified speed. This may cause abnormalities such as thermal runaway, increases in consumption power, or circuit destruction.

DISCLOSURE OF INVENTION

It is an object of the present invention to provide a digital interface decode receiver in which abnormalities are prevented even when receiving a digital signal having a format other than decodable ones.

A digital interface decode receiver according to one aspect of the present invention comprises a decoder circuit that decodes an input digital signal, a processing circuit that processes the digital signal decoded by the decoder circuit, and a controlling device that determines whether or not the input digital signal have a format that can be decoded by the decoder circuit, and stops the operation of the processing circuit when the input digital signal does not have a format that can be decoded by the decoder circuit.

In the digital signal interface decode receiver, the input digital signal is decoded by the decoder circuit, and the decoded digital signal is processed by the processing circuit. The controlling device then determines whether or not the input digital signal has a format that can be decoded by the decoder circuit; and if not, stops the operation of the processing circuit. This prevents abnormalities such as thermal runaway, increases in consumption power, and circuit destruction, even when a digital signal having a format other than decodable ones is applied.

The input digital signal may be a digital signal in accordance with a high-speed digital interface standard, including a video signal and an audio signal, the decoder circuit may extract the video and audio signals from the digital signal, and the processing circuit may process the video and audio signals extracted by the decoder circuit.

The controlling device may stop the processing circuit by stopping the supply of power-supply voltage or supply of an operation clock signal to the processing circuit.

In this case, when a digital signal having a format other than decodable ones is applied, the supply of power-supply voltage or supply of an operation clock signal to the processing circuit is stopped. This prevents abnormalities such as thermal runaway, increases in consumption power, and circuit destruction.

The digital interface decode receiver may further comprise a notification device that notifies a user that the operation of the processing circuit has been stopped, wherein the controlling device makes the notification device notify that the operation of the processing circuit has been stopped when the input digital signal does not have a format that can be decoded by the decoder circuit.

In this case, when the input digital signal does not have a format that can be decoded by the decoder circuit, the user is notified by the notification device that the operation of the processing circuit has been stopped. This allows the user to easily recognize that the digital signal input to the digital interface decode receiver does not have a decodable format.

The notification device may further include a display circuit that generates a signal for indicating a message, and the controlling device may control the display circuit such that the message indicative that the operation of the display circuit has been stopped is displayed when the input digital signal does not have a format that can be decoded by the decoder circuit.

In this case, the message indicative that the operation of the processing circuit has been stopped is displayed when the input digital signal does not have a format that can be decoded by the decoder circuit. This allows the user to easily recognize that the digital signal input to the digital interface decode receiver does not have a decodable format.

The notification device may include a voice output device, and the controlling device may control the voice output device such that a message indicative that the operation of the processing circuit has been stopped is output from the voice output device when the input digital signal does not have a format that can be decoded by the decoder circuit.

In this case, the message indicative that the operation of the processing circuit has been stopped is output as a voice, when the input digital signal does not have a format that can be decoded by the decoder circuit. This allows the user to easily recognize that the digital signal input to the digital interface decode receiver does not have a decodable format.

The digital interface decode receiver may further comprise a clock generation circuit that multiplies an input clock signal for output as a decoding clock signal, wherein the decoder circuit extracts a video signal and a synchronization signal from an input digital signal employing the decoding clock signal output from the clock generation circuit; the processing circuit processes the video signal extracted by the decoder circuit; and the controlling device determines whether or not the video signal is in a format that can be decoded by the decoder circuit based on the synchronization signal extracted by the decoder circuit and the decoding clock signal output from the clock generation circuit, and stops the operation of the processing circuit when the video signal does not have a format that can be decoded by the decoder circuit.

In this case, the clock generation circuit multiplies the input clock signal for output of the decoding clock signal, and the decoder circuit extracts the video signal and synchronization signal from the input digital signal employing the output decoding clock signal, followed by the processing of the extracted video signal by the processing circuit.

Moreover, the controlling device determines whether or not the video signal is in a format that can be decoded by the decoder circuit based on the synchronization signal and decoding clock signal; and if not, stops the operation of the processing circuit.

This prevents abnormalities such as thermal runaway, increases in consumption power, and circuit destruction, even when a digital signal having a format other than decodable ones is applied.

The controlling device may calculate a vertical frequency and a horizontal frequency for video based on the synchronization signal extracted by the decoder circuit and the decoding clock signal output from the clock generation circuit, to determine whether or not the video signal is in a format that can be decoded by the decoder circuit based on the calculated vertical frequency and horizontal frequency for video.

In this case, the vertical frequency and horizontal frequency for video are calculated based on the synchronization signal and decoding clock signal. Then, it is determined, based on the calculated vertical frequency and horizontal frequency for video, whether or not the video signal is in a format that can be decoded by the decoder circuit. This enables an accurate determination as to whether or not the video signal is in a decodable format.

The controlling device may store a vertical frequency and a horizontal frequency for video as a format that can be decoded by the decoder circuit for a comparison of the calculated vertical frequency and horizontal frequency for video with the stored vertical frequency and horizontal frequency for video, thereby determining whether or not the video signal is in a format that can be decoded by the decoder circuit.

In this case, it is easily determined whether or not the video signal is in a format that can be decoded by the decoder circuit by the comparison of the calculated vertical frequency and horizontal frequency for video with the stored vertical and horizontal frequencies for video.

The decoder circuit, processing circuit, controlling device, and clock generation circuit may be included in an integrated circuit.

In this case, the digital interface decode receiver can be made smaller in size, and also prevented from abnormalities even when a digital signal having a format other than decodable ones is applied thereto.

The controlling device may stop the processing circuit by stopping the supply of power-supply voltage or supply of an operation clock signal to the decoder circuit, processing circuit, and clock generation circuit.

In this case, when a digital signal having a format other than decodable ones is applied, the supply of power-supply voltage or supply of an operation clock signal to the decoder circuit, processing circuit, and clock generation circuit is stopped. This prevents abnormalities such as thermal runaway, increases in consumption power, and circuit destruction.

The digital interface decode receiver may further comprise a clock generation circuit that multiplies an input clock signal for output as a decoding clock signal, and a detection circuit that detects the frequency of the decoding clock signal output from the clock generation circuit, wherein the decoder circuit extracts a video signal and a synchronization signal from an input digital signal employing the decoding clock signal output from the clock generation circuit; the processing circuit processes the video signal extracted by the decoder circuit; and the controlling device determines whether or not the video signal is in a format that can be decoded by the decoder circuit based on the frequency detected by the detection circuit, and stops the operations of the decoder circuit, clock generation circuit, and processing circuit when the video signal does not have a format that can be decoded by the decoder circuit.

In this case, the input clock signal is multiplied and output as the decoding clock signal, whose frequency is detected by the detection circuit. The decoder circuit then extracts the video signal and synchronization signal from the input digital signal employing the decoder clock signal, followed by the processing of the extracted video signal by the processing circuit.

Moreover, the controlling device determines, based on the detected frequency, whether or not the digital signal is in a format that can be decoded by the decoder circuit; and if not, stops the operations of the decoder circuit, clock generation circuit, and processing circuit.

This prevents abnormalities such as thermal runaway, increases in consumption power, and circuit destruction, even when a digital signal having a format other than decodable ones is applied.

The controlling device may store a video dot clock frequency as a format that can be decoded by the decoder circuit for a comparison of the frequency detected by the detection circuit with the stored dot clock frequency, thereby determining whether or not the video signal is in a format that can be decoded by the decoder circuit.

In this case, it is determined whether or not the video signal is in a format that can be decoded by the decoder circuit by the comparison of the detected frequency with the stored dot clock frequency.

The decoder circuit, processing circuit, controlling device, clock generation circuit, and detection circuit may be included in an integrated circuit.

In this case, the digital interface decode receiver can be made smaller size, and also prevented from abnormalities even when a digital signal having a format other than decodable ones is applied thereto.

The digital interface decode receiver may further comprise a synchronization signal generation circuit that internally generates a synchronization signal, a synchronization signal selection circuit that selectively outputs the synchronization signal extracted by the decoder circuit and the synchronization signal generated by the synchronization signal generation circuit, and a display circuit that generates a signal for displaying a message, wherein the controlling device operates based on the synchronization signal output from the synchronization signal selection circuit, and when an input digital signal does not have a format that can be decoded by the decoder circuit, controls the synchronization signal selection circuit such that the synchronization signal generated by the synchronization signal generation circuit is output, while controlling the display circuit such that a message is displayed indicative that the operations of the decoder circuit, clock generation circuit, and processing circuit have been stopped.

In this case, the synchronization signal generation circuit internally generates the synchronization signal, and selectively outputs the synchronization signal extracted by the decoder circuit and the synchronization signal generated by the synchronization signal generation circuit. The controlling device operates based on the synchronization signal output from the synchronization signal selection circuit.

When the input digital signal does not have a format that can be decoded by the decoder circuit, the controlling device controls the synchronization signal selection circuit such that the synchronization signal generated by the synchronization signal generation circuit is output. At the time, the controlling device also controls the display circuit such that the message is displayed indicative that the operations of the decoder circuit, clock generation circuit, and processing circuit have been stopped.

This allows the user to easily recognize that the digital signal input to the digital interface decode receiver does not have a decodable format.

The decoder circuit, processing circuit, clock generation circuit, detection circuit, synchronization signal generation circuit, and synchronization signal selection circuit may be included in an integrated circuit, while the controlling device and display circuit may be included in a circuit external to the integrated circuit.

In this case, the digital interface decode receiver can be made smaller in size, and also prevented from abnormalities even when a digital signal having a format other than decodable ones is applied thereto.

The controlling device may stop the processing circuit by stopping the supply of power-supply voltage or supply of an operation clock signal to the decoder circuit, clock generation circuit, and processing circuit.

In this case, when a digital signal having a format other than decodable ones is applied, the supply of power-supply voltage or supply of an operation clock signal to the decoder circuit, clock generation circuit, and processing circuit is stopped. This prevents abnormalities such as thermal runaway, increases in consumption power, and circuit destruction.

The controlling device may be composed of a microcomputer. This allows a variety of processings to be performed in accordance with a program.

BRIEF DESCRIPTION OF DRAWINGS

FIG. 2 is a diagram showing an example of a list of formats that can be decoded in the interface decode receiver of FIG. 1;

FIG. 5 is a diagram showing an example of a message displayed on the screen of a display.

BEST MODE FOR CARRYING OUT THE INVENTION

First Embodiment

A first embodiment of the present invention will be described with reference to FIGS. 1 and 2.

Figure 1:
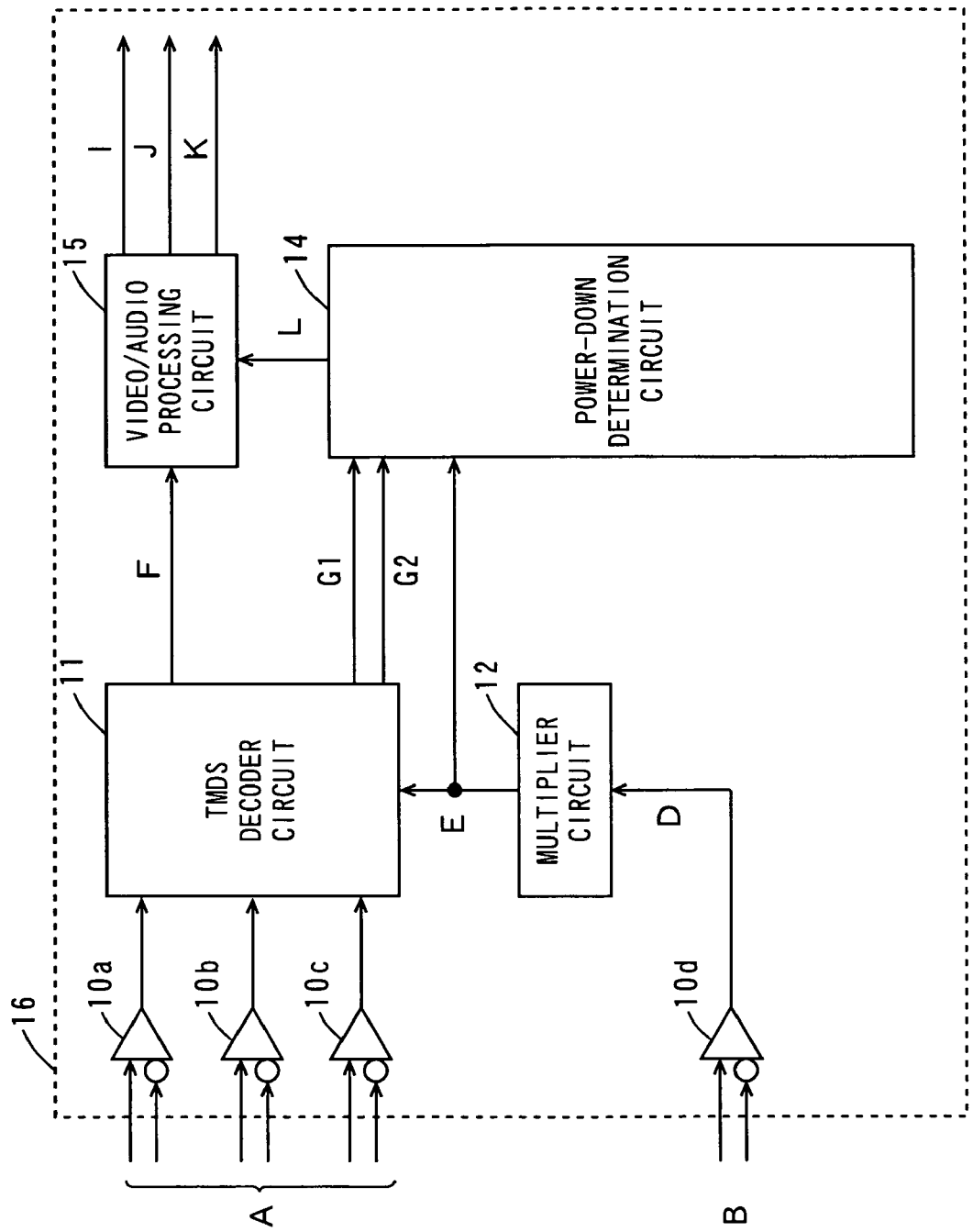
FIG. 1 is a block diagram showing the structure of a high-speed digital interface decode receiver according to a first embodiment of the present invention.

FIG. 1 is a block diagram showing the structure of a high-speed digital interface decode receiver according to a first embodiment of the present invention.

The high-speed digital interface decode receiver (hereafter abbreviated to the interface decode receiver) in FIG. 1 includes differential buffers 10a, 10b, 10c, 10d, a TMDS decoder circuit 11, a multiplier circuit 12, a power-down determination circuit 14, and a video/audio processing circuit 15. The interface decode receiver, which is composed of a receiver LSI (Large Scale Integrated Circuit) 16, is mounted in the video display of a television receiver or the like.

The interface decode receiver is provided with digital signals in accordance with a high-speed digital interface standard, such as the HMDI standard or DVI standard, from source equipment. The source equipment includes, for example, a DVD (Digital Versatile Disk) reproducing device, a STB (Set Top Box), or a personal computer.

In this embodiment, the interface decode receiver is connected to the source equipment via an HDMI-compliant HDMI interface cable. With the HDMI standard, it is possible to transmit video signals and also transmit supplemental data during blanking intervals (vertical and horizontal blanking intervals) of the video signals. The supplemental data contains audio signals and data packets referred to as Info Frame (Information Frame).

A clock-channel signal B among the digital signals is applied as a clock signal D to a multiplier circuit 12 via the differential buffer 10d. The multiplier circuit 12 multiplies the clock signal D, and outputs the multiplied clock signal D as a multiplied clock signal E.

Signals A among the digital signals except the clock channel are applied to the TMDS decoder circuit 11 via the differential buffers 10a, 10b, 10c. In this embodiment, the signals A include red-, blue-, and green-component signals. Alternatively, the signals A may include a luminance signal and two color difference signals.

The TMDS decoder circuit 11 parallel/serial converts and decodes the signals A except the clock channel for output of a horizontal synchronization signal G1, vertical synchronization signal G2, and video/audio signal F.

The video/audio processing circuit 15 separates the video/audio signal F output from the TMDS decoder circuit 11 into a video signal I, audio signal J, and control signal K for output.

The power-down determination circuit 14 detects the video format and clock frequency of a digital signal which is input using the horizontal synchronization signal G1 and vertical synchronization signal G2 output from the TMDS decoder circuit 11, and the clock signal E output from the multiplier circuit 12, for output of a power-down control signal L.

Now refer to FIG. 2, the operation of the power-down determination circuit 14 in the interface decode receiver of FIG. 1 will be described. FIG. 2 is a diagram showing a list of video formats that can be decoded in the interface decode receiver of FIG. 1.

FIG. 2 shows the horizontal frequency, vertical frequency, dot clock frequency, and number of displayed dots (the number of effective dots) for each video format. The displayed dot number is represented by the integral of the number of pixels in the horizontal direction and the number of pixels in the vertical direction (number of scanning lines) displayed on the screen.

FIG. 2 shows an interlace with 1080 scanning lines, a progressive with 720 scanning lines, an interlace with 480 scanning lines, and a progressive with 480 scanning lines.

The power-down determination circuit 14, which includes an internal storage device such as ROM (Read Only Memory) or non-volatile memory, stores in its internal storage device the list of decodable video formats as a LUT (Look Up Table)

The power-down determination circuit 14 counts the number of clocks within one period of the horizontal synchronization signal HD (i.e., the number of pulses of the clock signal E) and the number of horizontal vertical signals HD within one period of the vertical synchronization signal VD, employing the clock signal E obtained from the multiplier circuit 12, and the horizontal synchronization signal G1 and vertical synchronization signal G2 obtained from the TMDS decode circuit 11, to calculate the horizontal frequency and vertical frequency based on the clock number and the horizontal synchronization signal HD number. Furthermore, the power-down determination circuit 14 compares the calculated horizontal frequency and vertical frequency with the horizontal frequencies and vertical frequencies in the list shown in FIG. 2, to determine whether the input digital signal does or does not have a decodable video format, thereby outputting a power-down control signal L indicative of the determination. In the case where the input digital signal does not have a decodable format, the power-down control signal L controls the video/audio processing circuit 15 to enter a power-down mode.

The term power-down mode here means to stop the operation of the video-audio processing circuit, including e.g. the process of stopping the clock signals to be supplied to the video/audio processing circuit 15, or the process of turning off the video-audio processing circuit 15.

Then, after the video format of the digital signal to be input has become decodable, the power-down mode is released.

In the interface decode receiver according to the embodiment, the video format of the input digital signal is determined, and the video/audio processing circuit 15 is placed in the power-down mode, as described in the forgoing. This makes it possible to prevent the thermal runaway of the receiver LSI 16 to achieve power savings, and prevent the destruction of the receiver LSI 16.

In the embodiment, the TMDS decoder circuit 11 corresponds to a decoder circuit; the video/audio processing circuit 15 corresponds to a processing circuit; the power-down determination circuit 14 corresponds to a controlling device; the multiplier circuit 12 corresponds to a clock generation circuit; and the receiver LSI 16 corresponds to an integrated circuit.

The above-described embodiment is only by means of an example, and such a high-speed digital interface decode receiver can be implemented in other methods. For example, a microcomputer external to the receiver LSI 16 may be used as the controlling device instead of the power-down determination circuit 14. Alternatively, the high-speed digital interface decode receiver may be configured to receive from the source equipment digital signals in accordance with another high-speed digital interface standard such as the DVI standard.

Second Embodiment

A second embodiment of the present invention will be described with reference to FIG. 3.

Figure 3:
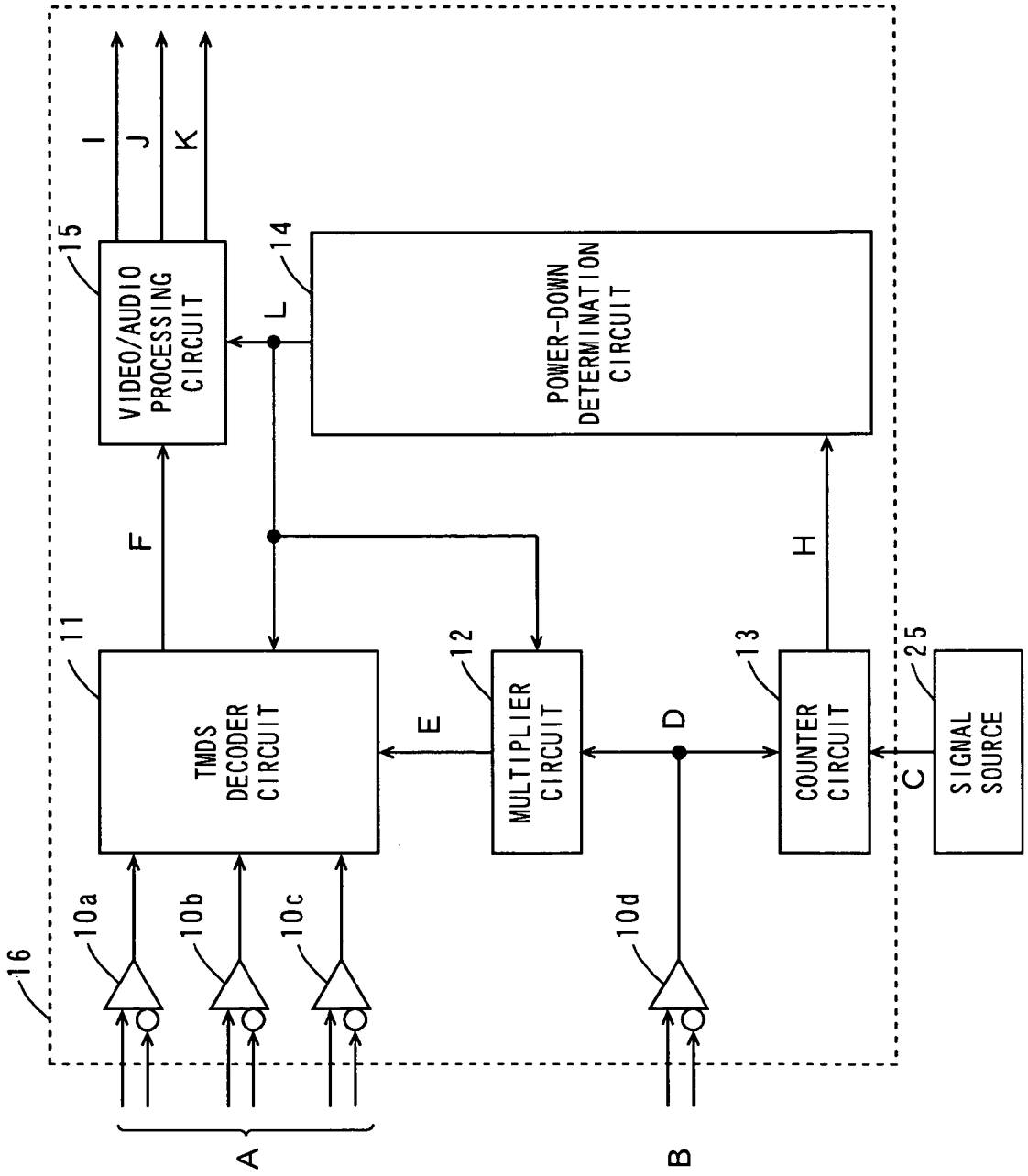
FIG. 3 is a block diagram showing the structure of a high-speed digital interface decode receiver according to a second embodiment of the present invention.

FIG. 3 is a block diagram showing the structure of a high-speed digital interface decode receiver according to a second embodiment of the present invention.

In the interface decoder receiver of FIG. 3, parts identical or corresponding to those in the interface decoder receiver of FIG. 1 are labeled with the identical symbols. The interface decode receiver of FIG. 3 differs from that shown in FIG. 1 as follows.

The interface decode receiver of FIG. 3 additionally comprise a counter circuit 13.

The counter circuit 13 is provided with a clock signal C having a certain frequency, which is input from a signal source 25 inside a video display, and also with a clock signal D output from the differential buffer 10d. The clock signal C has a lower frequency than that of the clock signal D.

The counter circuit 13 counts the number of pulses (clock number) of the clock signal D within one period of the clock signal C to output a clock counter signal H indicative of the counted value.

The power-down determination circuit 4 calculates the dot clock frequency based on the clock counter signal H output from the counter circuit 13. Moreover, the power-down determination circuit 14 compares the calculated dot clock frequency with the dot clock frequencies shown in the list of FIG. 2, to determine whether an input digital signal does or does not have a decodable video format, for output of a power-down determination signal L indicative of the determination to the TMDS decoder circuit 11, multiplier circuit 12, and video/audio processing circuit 15. In the case where the input digital signal does not have a decodable video format, the TMDS decoder circuit 11, multiplier circuit 12, and video/audio processing circuit 15 are controlled to enter the power-down mode.

Then, after the video format of the digital signal to be input has become decodable, the power-down mode is released.

In the interface decode receiver according to the embodiment, the video format of the input digital signal is determined, and the TMDS decoder circuit 11, multiplier circuit 12, and video/audio processing circuit 15 are placed in the power-down mode, as described in the forgoing. This makes it possible to prevent the thermal runaway of the receiver LSI 16 to achieve power savings, and prevent the destruction of the receiver LSI 16.

In the embodiment, the TMDS decoder circuit 11 corresponds to a decoder circuit; the video/audio processing circuit 15 corresponds to a processing circuit; the power-down determination circuit 14 corresponds to a controlling device; the multiplier circuit 12 corresponds to a clock generation circuit; the counter circuit 13 corresponds to a detection circuit; and the receiver LSI 16 corresponds to an integrated circuit.

The above-described embodiment is only by means of an example, and such a high-speed digital interface decode receiver can be implemented in other methods. For example, a microcomputer external to the receiver LSI 16 may be used as the controlling device instead of the power-down determination circuit 14. Alternatively, the high-speed digital interface decode receiver may be configured to receive from the source equipment digital signals in accordance with another high-speed digital interface standard such as the DVI standard.

Third Embodiment

A third embodiment of the present invention will be described with reference to FIG. 4.

Figure 4:
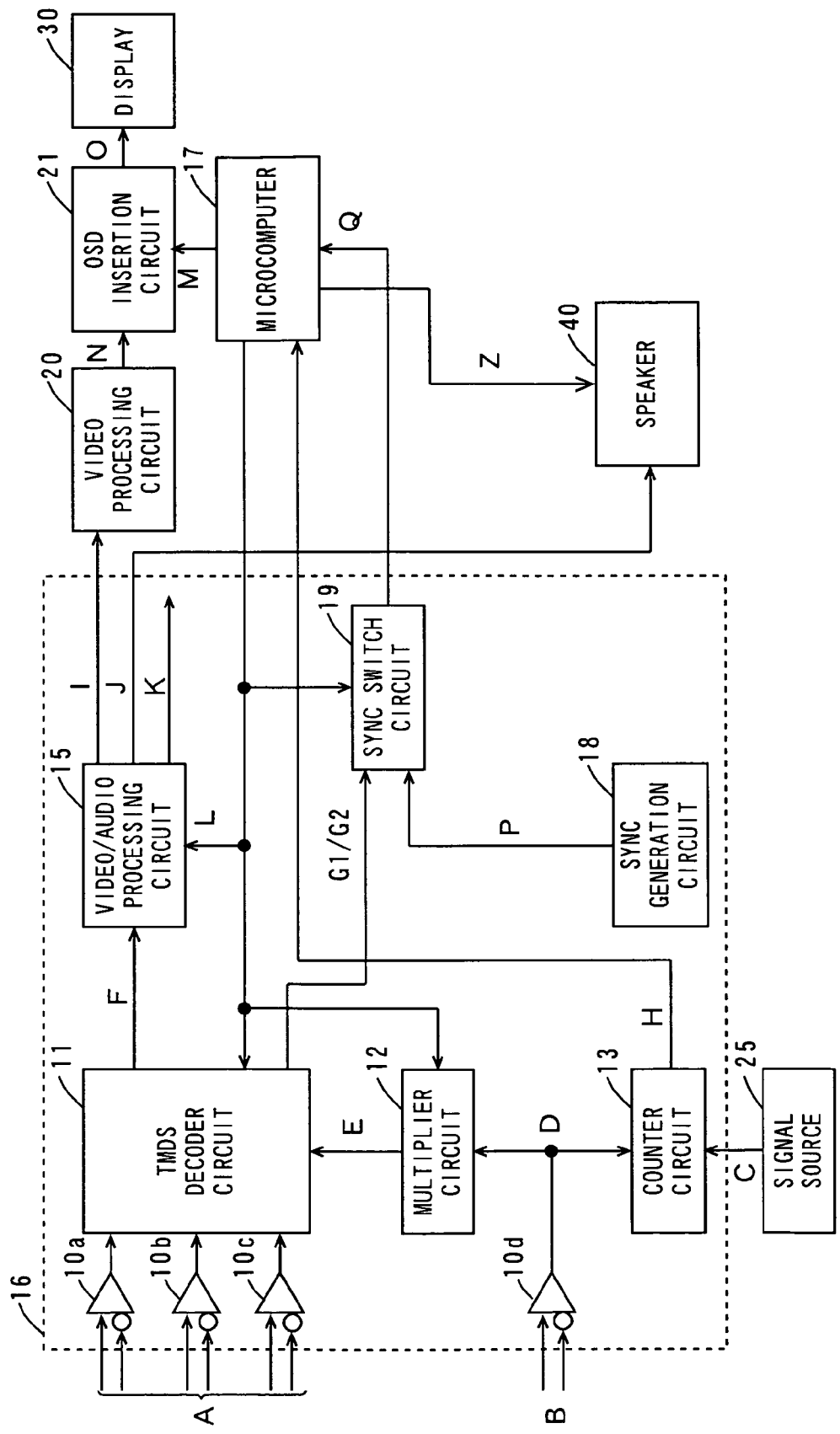
FIG. 4 is a block diagram showing the structure of a high-speed digital interface decode receiver according to a third embodiment of the present invention.
Figure 6:
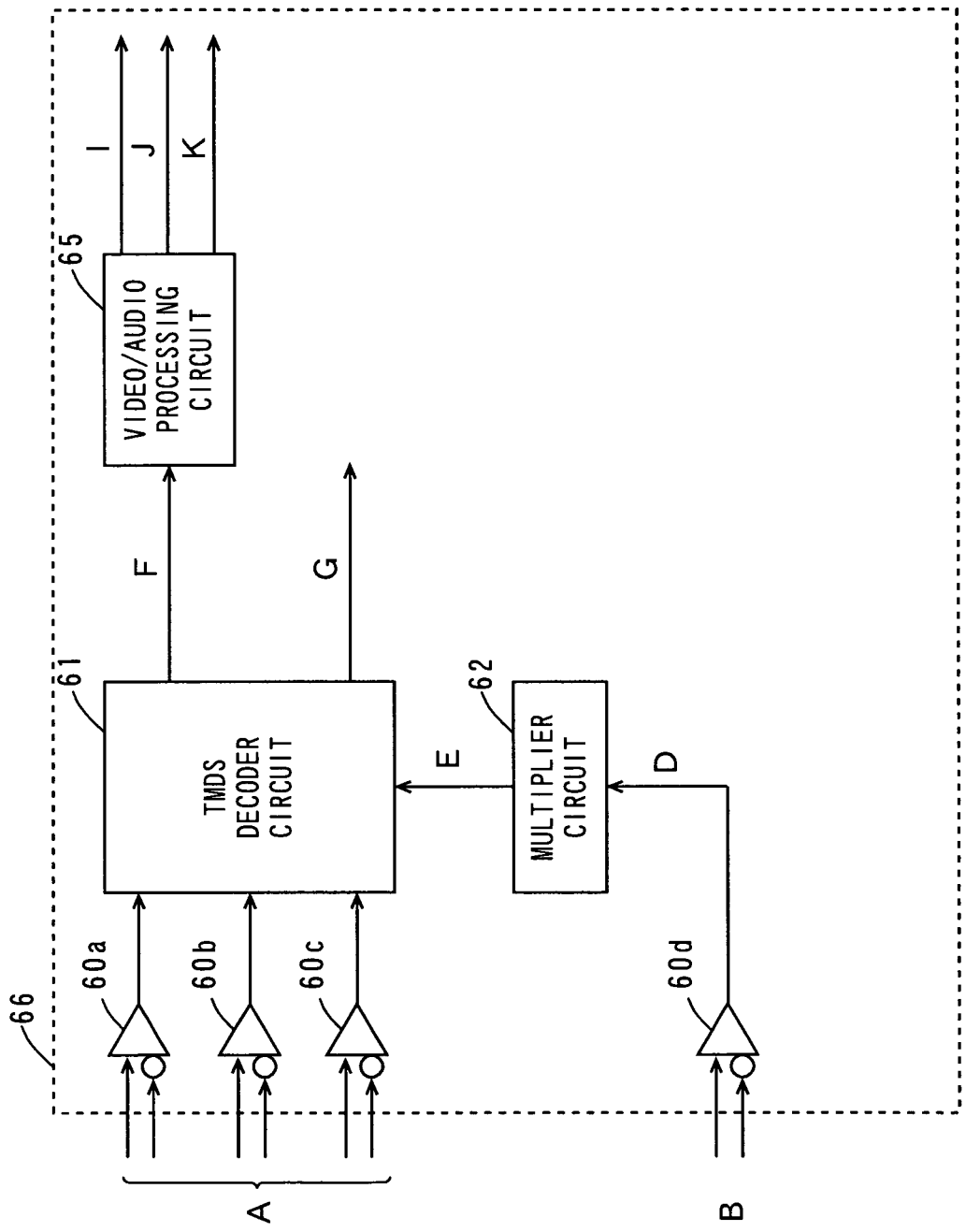
FIG. 6 is a block diagram showing an example of a conventional high-speed digital interface decode receiver.

FIG. 4 is a block diagram showing the structure of a high-speed digital interface decode receiver according to a third embodiment of the present invention.

In the interface decoder receiver of FIG. 4, parts identical or corresponding to those in the interface decoder receiver of FIG. 3 are labeled with the identical symbols. The interface decode receiver of FIG. 4 differs from that shown in FIG. 3 as follows.

The interface decode receiver of FIG. 4 additionally comprise, instead of the power-down determination circuit 14 of FIG. 3, a microcomputer 17, a sync generation circuit 18, a sync switch circuit 19, a video processing circuit 20, and an OSD (On Screen Display) insertion circuit 21. The sync generation circuit 18 and sync switch circuit 19 are disposed internal to the receiver LSI 16.

The OSD insertion circuit 21 is connected with a display 30 including a CRT (Cathode Ray Tube), liquid crystal display, plasma display, or the like, while the video/audio processing circuit 15 is connected with a speaker 40.

The counter circuit 13 is provided with a clock signal C having a certain frequency, which is input from the signal source 25 inside the video display, and also with a clock signal D output from the differential buffer 10d. The clock signal C has a lower frequency than that of the clock signal D.

The counter circuit 13 counts the number of pulses (clock number) of the clock signal D within one period of the clock signal C for output of a clock counter signal H indicative of the counted value.

The sync generation circuit 18 continuously generates a free-running synchronization signal P in the receiver LSI 16. The synchronization signal P includes a vertical synchronization signal and a horizontal synchronization signal. The sync switch circuit 19 switches between horizontal synchronization signal G1 and vertical synchronization signal G2 output from the TMDS decoder circuit 11 and the synchronization signal P output from the sync generation circuit 18, based on the power-down control signal L output from the microcomputer 17, for output as a synchronization signal Q.

The microcomputer 17 calculates the dot clock frequency based on a clock counter signal H output from the counter circuit 13. Moreover, the microcomputer 17 compares the calculated dot clock frequency with the dot clock frequencies shown in the list of FIG. 2, to determine whether an input digital signal does or does not have a decodable video format, for output of a power-down control signal L indicative of the determination to the TMDS decoder circuit 11, multiplier circuit 12, video/audio processing circuit 15, and sync switch circuit 19.

In the case where the input digital signal does not have a decodable video format, the TMDS decoder circuit 11, multiplier circuit 12, and video/audio processing circuit 15 are controlled to enter the power-down mode.

The sync switch circuit 19 normally outputs the horizontal synchronization signal G1 and vertical synchronization signal G2 output from the TMDS decoder circuit 11 to the microcomputer 17 as a synchronization signal Q. In the case where the input digital signal does not have a decodable video format, the sync switch circuit 19 outputs, in response to the power-down control signal L output from the microcomputer 17, the synchronization signal P output from the synchronization signal generation circuit 18 as a synchronization signal Q to the microcomputer 17, instead of the horizontal synchronization signal G1 and vertical synchronization signal G2 output from the TMDS decoder circuit 11.

In this case, the microcomputer 17 outputs a message display signal M in synchronization with the synchronization signal Q output from the sync switch circuit 19 to the OSD insertion circuit 21.

The video processing circuit 20 applies video processing to a video signal I output from the video/audio processing circuit 15, such as image quality correction. With the video signal output from the video processing circuit 20 being absent in this case, the OSD insertion circuit 21 inserts a graphic signal for full display on the screen based on the message display signal M output from the microcomputer 17. This causes a message to be displayed on the screen of the display 30. FIG. 5 is a diagram showing an example of a message displayed on the screen of the display 30.

In addition, a signal Z output from the microcomputer 17 causes the same message as the one displayed on the screen to be output as a voice from the speaker 40.

In the interface decode receiver according to the embodiment, the format of the input digital signal is determined, and the TMDS decoder circuit 11, multiplier circuit 12, and video/audio processing circuit 15 are placed in the power-down mode, as described in the foregoing. This makes it possible to prevent the thermal runaway of the receiver LSI 16 to achieve power savings, and prevent the destruction of the receiver LSI 16. Moreover, in the case where a digital signal having a different video format other than the decodable ones is input, a message can be displayed on the screen of the display 30. At the time, the message can be output as a voice from the speaker 40.

In the embodiment, the TMDS decoder circuit 11 corresponds to a decoder circuit; the video-audio processing circuit 15 corresponds to a processing circuit; the multiplier circuit 12 corresponds to a clock generation circuit; the counter circuit 13 corresponds to a detection circuit; and the microcomputer 17 corresponds to a controlling device. Moreover, the sync switch circuit 19 corresponds to a synchronization signal selection circuit; and the sync generation circuit 18 corresponds to a synchronization signal generation circuit. In addition, the OSD insertion circuit 21 corresponds to a notification device or display circuit; the speaker 40 corresponds to a notification device or voice output device; and the receiver LSI 16 corresponds to an integrated circuit.

The above-described embodiment is only by means of an example, and the high-speed digital interface decode receiver can be implemented in other methods. For example, a control circuit may be formed internal to the receiver LSI 16 as the controlling device instead of the microcomputer 17. Alternatively, the high-speed digital interface decode receiver may be configured to receive from the source equipment digital signals in accordance with another high-speed digital interface standard such as the DVI standard.

Still alternatively, light emitting devices such as LEDs (Light Emitting Diodes) may be used as the notification device to notify the user that a digital signal has a format other than the decodable formats.

The invention claimed is:
1. A digital interface decode receiver, comprising:
a decoder circuit that serial/parallel converts signals except a clock channel in a digital signal including a video signal and an audio signal in accordance with a high-speed digital interface standard, and outputs a synchronization signal and a video/audio signal;

a processing circuit that separates the video/audio signal into a video signal, an audio signal and a control signal, and outputs the video signal, the audio signal and the control signal;

a clock generation circuit that multiplies a first clock signal of the clock channel of the digital signal, and outputs the multiplied clock signal as a decoding clock signal;

a signal source that outputs a reference clock signal having a frequency lower than a frequency of the first clock signal;

a detection circuit that counts a number of pulses of the first clock signal within one period of the reference clock signal, and outputs a clock counter signal indicative of a counted value; and a controlling device that calculates a dot clock frequency of the digital signal based on the clock counter signal, and determines whether the calculated dot clock frequency matches a dot clock frequency of a decodable format stored in advance, wherein when the calculated dot clock frequency does not match the dot clock frequency of the decodable format, the controlling device stops operation of the decoder circuit, the clock generation circuit and the processing circuit by stopping supply of a power-supply voltage or supply of an operation clock signal to the decoder signal, the clock generation circuit and the processing circuit, and when the calculated dot clock frequency matches the dot clock frequency of the decodable format, the controlling device does not stop the operation of the decoder circuit, the clock generation circuit and the processing circuit.

2. The digital interface decode receiver according to claim 1, further comprising a notification device that is controlled by the controlling device to notify a user of the stopping of the operation of the decoder circuit, the clock generation circuit and the processing circuit, when the controlling device stops the operation of the decoder circuit, the clock generation circuit and the processing circuit.

3. The digital interface decode receiver according to claim 2, wherein the notification device includes a display circuit that generates a signal for indicating a message, and the controlling device controls the display circuit such that a message indicative of the stopping of the operation of the decoder circuit, the clock generation circuit and the display circuit is displayed when the digital signal does not have a dot clock frequency of a format decodable by the decoder circuit.

4. The digital interface decode receiver according to claim 2, wherein the notification device includes a voice output device, and the controlling device controls the voice output device such that a message indicative of the stopping of the operation of the decoder circuit, the clock generation circuit and the processing circuit is output when the digital signal does not have a dot clock frequency of a format decodable by the decoder circuit.

* * * * *

UNITED STATES PATENT AND TRADEMARK OFFICE
CERTIFICATE OF CORRECTION

PATENT NO. : 7,596,188 B2  Page 1 of 1
APPLICATION NO. : 10/548066
DATED : September 29, 2009
INVENTOR(S) : Gotanda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 908 days.

Signed and Sealed this

Twenty-eighth Day of September, 2010

David J. Kappos
*Director of the United States Patent and Trademark Office*